United States Patent [19]

Kawai

[11] Patent Number: 4,871,937
[45] Date of Patent: Oct. 3, 1989

[54] VIBRATION WAVE MOTOR
[75] Inventor: Sumio Kawai, Hachioji, Japan
[73] Assignee: Olympus Optical Co., Ltd., Tokyo, Japan
[21] Appl. No.: 168,178
[22] Filed: Mar. 15, 1988
[30] Foreign Application Priority Data Mar. 27, 1987 [JP] Japan ................................. 62-74955

[51] Int. Cl.$^4$ .......................................... H01L 41/08
[52] U.S. Cl. ................................................. 310/323
[58] Field of Search ............................... 310/323, 328

[56] References Cited

U.S. PATENT DOCUMENTS

| 4,484,099 | 11/1984 | Kawai et al. | 310/328 X |
| 4,513,219 | 4/1985 | Katsuma et al. | 310/328 |
| 4,645,964 | 2/1987 | Hiramatsu et al. | 310/328 X |
| 4,649,311 | 3/1987 | Mukohjima et al. | 310/328 X |
| 4,672,256 | 6/1987 | Okuno et al. | 310/328 X |
| 4,692,651 | 9/1987 | Hiramatsu et al. | 310/328 X |
| 4,736,129 | 4/1988 | Endo et al. | 310/328 |
| 4,743,788 | 5/1988 | Takagi et al. | 310/328 X |

FOREIGN PATENT DOCUMENTS

| 59-96882 | 6/1984 | Japan . |
| 59-96883 | 6/1984 | Japan . |
| 60-96183 | 5/1985 | Japan . |
| 60-210174 | 10/1985 | Japan . |
| 61-106077 | 5/1986 | Japan . |

Primary Examiner—Mark O. Budd
Attorney, Agent, or Firm—Kenyon & Kenyon

[57] ABSTRACT

In a vibration wave motor having a vibration member and a movable member press-contacted to the vibration member so as to be rotatably driven thereby, the vibration member is supported by a plurality of elastic supporting arms and the elasticity of the supporting arms produces a frictional force between the vibration member and the movable member.

4 Claims, 2 Drawing Sheets

VIBRATION WAVE MOTOR

BACKGROUND OF THE INVENTION

1. Field of the Invention

This invention relates to a vibration wave motor, and more particularly to a structure for supporting a vibration member in a vibration wave motor.

2. Description of the Prior Art

A known vibration wave motor includes a vibration member and a movable member. The vibration member has an elastic metal member and electrostrictive elements fixed to the elastic member. When an AC voltage for driving is applied to the electrostrictive elements, elliptic vibrations are produced on a surface of the elastic metal member. The movable member is frictionally contacted to the vibration member so as to be rotatably driven by the elliptic vibrations. In fixing the vibration member to a motor case, i.e., a stator, it is necessary to reduce to a minimum the transmission of vibration from the vibration member to the stator.

For that purpose, various supporting structures have been proposed. One of the most commonly used supporting structures comprises a means for supporting a vibration member through an absorber made of rubber, etc., as described in U.S. Pat. No. 4,513,219. Further, as described in U.S. Pat. Nos. 4,634,915 and 4,649,311, it has been proposed to provide a vibration member with auxiliary vibration members to be used as supporting members, in which a standing wave is set up with one of its nodes fixed at a stator or a motor case.

However, the conventional supporting means as described in U.S. Pat. No. 4,513,219 has the following problems:

(1) Since rubber and the like are used for supporting, the position of the vibration member is unstable and cannot be fixed.

(2) In order to drive a vibration wave motor, the movable member must be press-contacted to the vibration member with a strong pressure. If the pressure is intensified, however, rubber and the like are subjected to elastic deformation and their vibration absorbency is reduced, so that the efficiency of the motor is lowered and noise is produced.

(3) Since rubber and the like are not subjected to a uniform elastic deformation, the distribution of the pressure between the vibration member and the movable member is not uniform, so that the motor rotates unevenly and noise is produced.

Further, the supporting means as described in U.S. Pat. Nos. 4,634,915 and 4,649,311 has the following drawbacks:

(1) Although the position of the vibration member can be fixed, a supporting portion must be relatively long in order to set up a standing wave in the supporting portion, so that a substantial space is necessary for the supporting portion. As described in U.S. Pat. Nos. 4,634,915 and 4,649,311, the relationship between the frequency and length of the auxiliary vibration member (supporting member) is represented by the following equation, assuming that the length of the auxiliary vibration member is sufficiently longer than its thickness and its sectional shape is uniform:

$$1 = \beta^4 \sqrt{\frac{EI}{\rho A \omega^2}}$$

where 1 is the length of the auxiliary vibration member, $\beta$ is a constant corresponding to the order of vibration, E is the modulus of longitudinal elasticity of the auxiliary vibration member, I is a sectional secondary moment of the auxiliary vibration member, $\rho$ is the density of the auxiliary vibration member, A is a sectional area of the auxiliary vibration member, and $\omega$ is an angular frequency. Assume that the auxiliary vibration member is a plate having the thickness h and breadth b, the cross section of which is a rectangle. Since $I = bh^3/2$, the above equation can be transformed as follows:

$$1 = \beta^4 \sqrt{\frac{Eh^2}{48\pi^2 f^2 \rho}}$$

where f is a vibration frequency of the auxiliary vibration member. If the auxiliary vibration member is a rectangular plate of stainless steel having the thickness of 1 mm, 1 is 0.54 mm in case of the fundamental vibration. In this case, the rigidity of the member is so high that bending vibration is hardly produced. In order that the above equation can be established, the length 1 must be sufficiently longer than the thickness of the plate. Therefore, it is necessary to reduce the thickness of the plate, lengthen the length 1 and produce vibration in a mode of higher order. This inevitably requires a large space for the auxiliary vibration members.

(2) In order to apply a stable pressure, an urging member such as a spring is necessary in addition to the supporting member.

SUMMARY OF THE INVENTION

A primary object of the present invention is to provide a vibration wave motor which resolves the shortcomings of the conventional vibration wave motors.

Another object of the present invention is to provide a supporting structure for a vibration wave motor in which vibration is hardly transmitted to a motor case.

A further object of the present invention is to provide a vibration wave motor in which a constant friction contact pressure between a vibration member and a movable member can be obtained by a supporting member.

According to the present invention, in order to achieve the above objects, a surface of a vibration member different from its surface frictionally contacted to a movable member is supported by a plurality of elastic supporting arms, the bases of the elastic supporting arms being fixed to a stator.

Other objects and advantages of the present invention will be apparent from the following description of the preferred embodiments of the present invention.

DESCRIPTION OF THE PREFERRED EMBODIMENTS

Referring to the accompanying drawings, the preferred embodiments of the present invention are described.

Figures 1, 2:
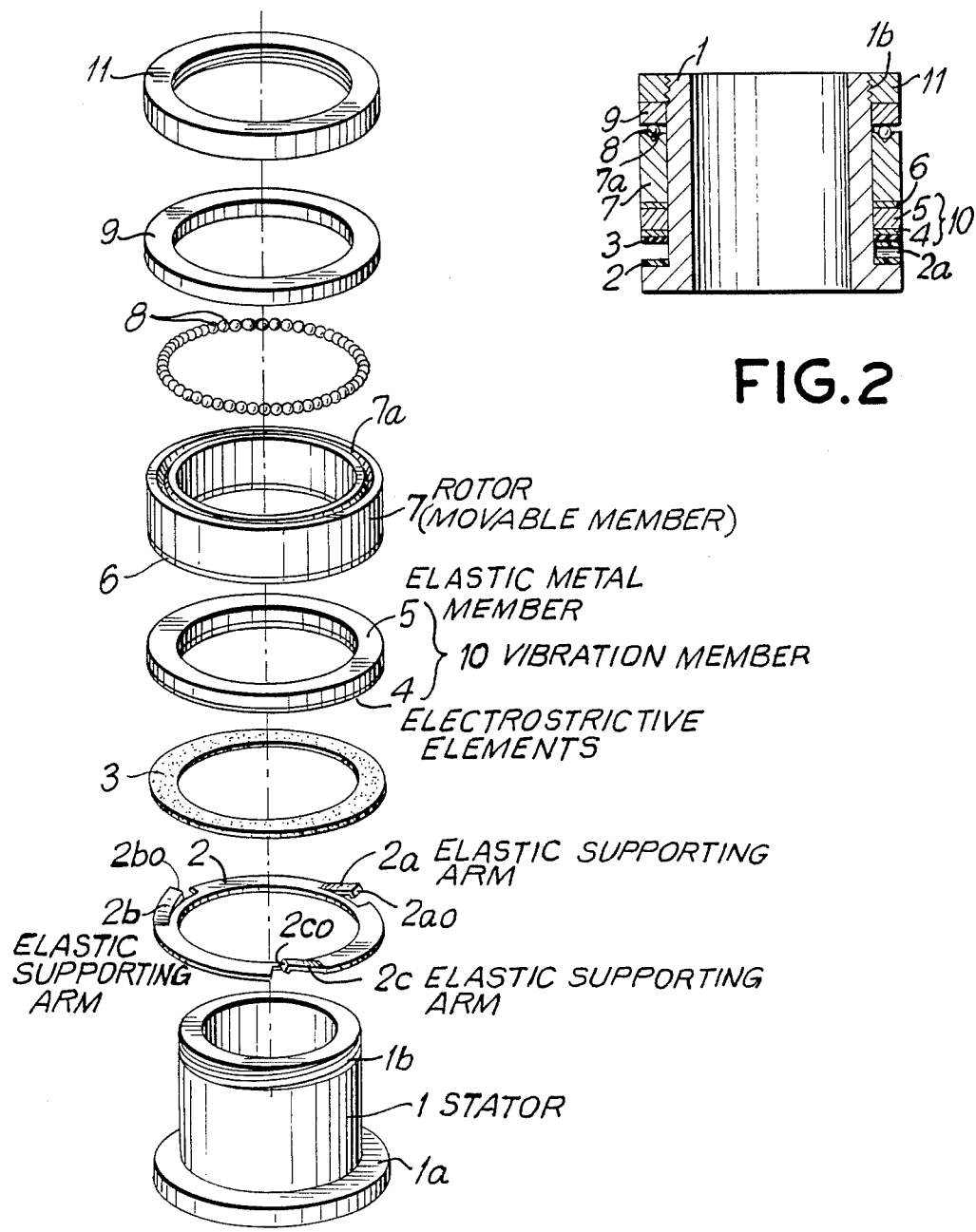
FIG. 1 is a developed perspective view of a vibration wave motor according to a first embodiment of the present invention.
FIG. 2 is a sectional view of the vibration wave motor shown in FIG. 1.

FIGS. 1 and 2 show a first embodiment of the present invention. A stator 1 is formed by a cylindrical member which has along its lower end periphery an outward flange 1a for mounting a vibration member 10, a movable member 7, etc., and is provided along its upper end periphery with screw threads 1b for screwing a stop ring 11 thereon. A supporting plate 2 made of a ring-shaped elastic thin plate is fixed on the flange 1a by means of adhesives, screws, etc.

The supporting plate 2 is provided at three equally spaced positions along its periphery with elastic supporting arms 2a, 2b and 2c cut upwards in the form of partial arcs. The supporting arms 2a, 2b and 2c are provided at their free ends with supporting portions $2a_0$, $2b_0$ and $2c_0$, respectively, which are bent down with their ends slanted downwards. The supporting portions $2a_0$, $2b_0$ and $2c_0$ serve to elastically support the vibration member 10 with a ring-shaped vibration preventing member 3 made of silicone rubber, etc., intervening therebetween.

The vibration member 10 is formed by a multiplicity of electrostrictive elements 4 fixed to the lower end surface of a ring-shaped elastic metal member 5 and serves to produce elliptical vibrations on the upper end surface of the elastic metal member 5 by applying to the electrostrictive elements 4 an AC voltage for driving, as is already known. A rotor 7 as a movable member formed by a cylindrical member contacts the upper end surface of the elastic metal member 5 of the ring-shaped vibration member 10 through a slider 6 integrally mounted on the lower end surface of the rotor 7. The rotor 7 is rotatably arranged with its inner surface closely fitted to the outer surface of the cylindrical member of the stator 1. A ring-shaped, V-notched ball receiving groove 7a is cut off approximately in the middle of the upper end surface of the rotor 7. In the ball receiving groove 7a, a series of many balls 8 are arranged for reducing rolling friction in the same manner as a ball bearing. A ball pushing ring 9 abuts against the balls 8 and the stop ring 11 is screwed on the screw threads 1b of the stator 1.

The rotor 7 is pushed against the vibration member 10 by screwing the stop ring 11 on the screw threads 1b of the stator 1 to cause the ball pressing ring 9 to push the rotor 7 through the balls 8 so that the lower end surface of the slider 6 is pressed against the upper end surface of the vibration member 10.

According to this embodiment, since the vibration member 10 is pressed against the rotor 7 by the supporting arms 2a, 2b and 2c of the supporting plate 2, no special pressure contact mechanism is needed. Further, the spring constant of the supporting arms 2a, 2b and 2c can be arbitrarily selected by designing the length, thickness, material, etc., of the arms correspondingly, so that an optimal design can be realized in which the vibration of the vibration member 10 is not transmitted to the stator 1 and the loss of the vibration in the supporting plate 2 is reduced. Moreover, since the supporting arms 2a, 2b and 2c are in the form of partial arcs, the space occupied by the supporting plate 2 does not extend from the inner and outer surfaces of the vibration member 10 in the radial direction and is approximately as thin as the thickness of the supporting plate 2 in the thrust direction, so that the size of the motor itself can be reduced. Normally, it is necessary to provide a rotation stopper for preventing the vibration member 10 from rotating with respect to the stator 1. According to the present invention, however, no special rotation stopper is needed since the vibration preventing member 3 serves to prevent sliding.

Figure 3:
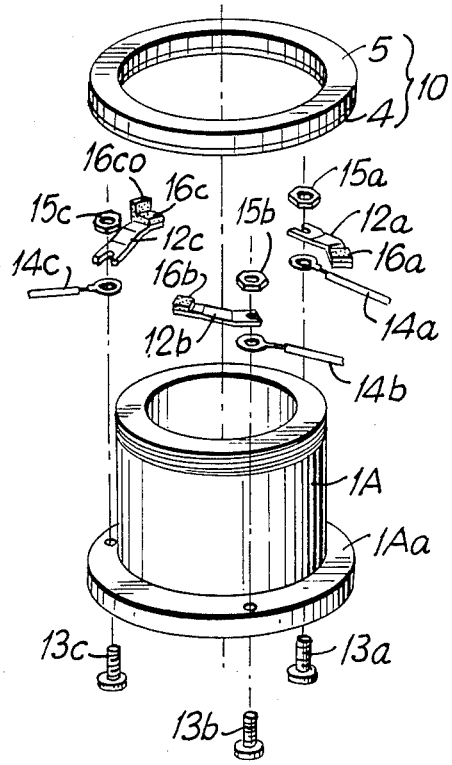
FIG. 3 is a developed perspective view of a main part of a vibration wave motor according to a second embodiment of the present invention.
Figure 4:
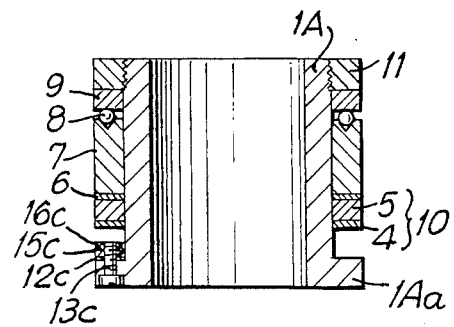
FIG. 4 is a sectional view of the vibration wave motor shown in FIG. 3.
Figure 5:
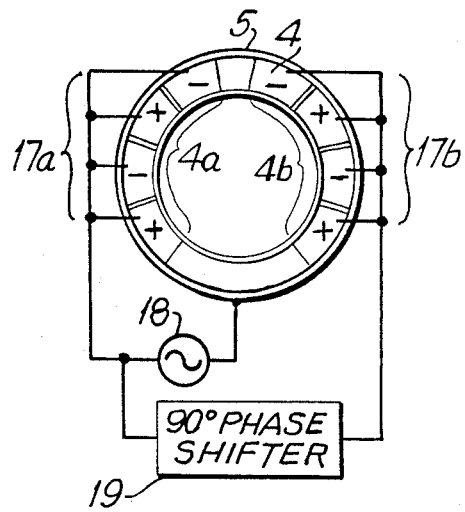
FIG. 5 is a diagram showing electrode terminals of the vibration wave motor shown in FIG. 3.

FIGS. 3 to 5 illustrate a second embodiment of the present invention. In this embodiment, the structure of supporting arms for supporting a vibration member 10 is different from that of the first embodiment.

In this embodiment, there are a plurality of supporting arms, for example, three elastic supporting arms 12a, 12b and 12c as shown in FIG. 3. The elastic supporting arms 12a, 12b and 12c are formed by electrically conductive elastic members in the form of partial arcs with their ends slanted upwards. The bases of the elastic supporting arms 12a, 12b and 12c are equally spaced on an outward flange 1Aa of a stator 1A formed by a cylindrical member and are secured to the outward flange 1Aa in such a manner that screws 13a, 13b and 13c are inserted upwards through the flange 1Aa and the bases of the elastic supporting arms 12a, 12b and 12c and that nuts 15a, 15b and 15c are screwed on the screws 13a, 13b and 13c, respectively. The elastic supporting arms 12a, 12b and 12c are provided on their end portions with fixed supporting pieces 16a, 16b and 16c, respectively, which are made of electrically conductive rubber. The supporting pieces 16a and 16b are formed by rectangular pieces and the supporting piece 16c has an L-shaped profile. The vertical portion $16c_0$ of the supporting piece 16c elastically contacts the peripheral side surface of an elastic metal member 5. The supporting pieces 16a, 16b and 16c support a vibration member 10 formed by the elastic metal member 5 and electrostrictive elements 4 and constitute electric contacts which are in pressure contact with the elastic metal member 5 and two groups 17a and 17b of the electrodes of the electrostrictive elements 4 as shown in FIG. 5. The bases of the supporting arms 12a, 12b and 12c are coupled with the connecting terminals of lead wires 14a, 14b and 14c, respectively, which are connected to an AC power supply 18.

As is usual with conventional vibration wave motors, the vibrating member 10 is formed by bonding two groups 4a and 4b of electrostrictive elements on one end surface of the elastic metal member 5, the electrostrictive element groups 4a and 4b being so spaced as to cause a passe shift of λ/4. The elastic metal member 5 also serves as a ground electrode for the electrostrictive element groups 4a and 4b, and the supporting arm 12c as a ground contact elastically contacts the elastic metal member 5 through he supporting piece 16c. The supporting arms 12a and 12b elastically contact the electrodes 17a and 17b of the electrostrictive element groups 4a and 4b through the supporting pieces 16a and 16b, respectively. An AC voltage $V = V_0 \sin\omega t$ is applied to the electrostrictive element group 4a from the AC power supply 18 while an AC voltage $V = V_0 \sin(\omega t + \pi/2)$ which is shifted by $\lambda/4$ is applied to the electrostrictive element group 4b from the AC power supply 18 through a 90° phase shifter 19.

According to the above structure, the supporting arms 12a, 12b and 12c can also serve as electrode terminals. Moreover, since the electrode terminals can be positioned in places where no vibration is propagated, the lead wires, terminals, etc., will not be broken. As other aspects of structure are the same as in the first embodiment, the same numerical symbols are assigned to the same members and their description is omitted.

Figure 6:
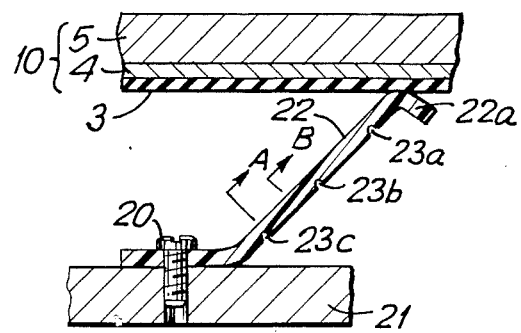
FIG. 6 is a partial sectional view of a main part of a vibration wave motor according to a third embodiment of the present invention.

FIG. 6 is a partial sectional view showing a main part of a third embodiment of the present invention. This embodiment is directed to limiting forcibly the mode of vibration produced in supporting arms. For that purpose, there is provided an elastic supporting arm 22 with its base secured to a flange 21 of a stator by a screw 20. The free end portion of the elastic supporting arm 22 is slanted upwards with its extreme end portion bent down slantingly to form a supporting portion 22a. The elastic supporting arm 22 is provided between the base and the supporting portion 22a with, for example, three grooves 23a, 23b and 23c perpendicular to the longitudinal direction of the arm 22 so that the cross-sectional shape of the elastic supporting arm 22 at the position A is different from that at the position B. A plurality of such supporting arms 22 are equally spaced on the flange 21 and their supporting portions 22a support a vibration member 10 elastically with a vibration preventing member 3 intervening therebetween.

If the grooves 23a, 23b and 23c are provided in this manner, three standing waves are set up in the supporting arm 22 with two of the nodes of the standing waves existing at the base and supporting portion 22a of the supporting arm 22. If the mode of vibration can be limited, it is easy to fix the nodes so as to reduce the loss of vibration, thus the loss of vibration of the vibration member caused by supporting can be minimized. Also in view of limiting the mode of vibration of supporting members, it is apparent that the structure of the present invention is effective since the arms can be relatively longer.

Figure 7:
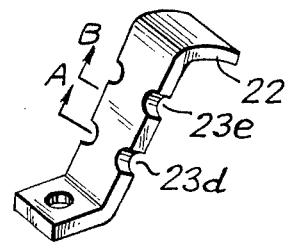
FIG. 7 is a perspective view of a variation of the supporting arm shown in FIG. 6.

In order to limit the vibration of the arm, the grooves 23a, 23b and 23c are provided in the embodiment shown in FIG. 6. However, the same result can be obtained by partially or continuously modifying the cross-sectional shape of the arm, for example, by means of cutouts 23d and 23e in an arm 22 as shown in FIG. 7, or by partially or continuously varying the modulus of longitudinal elasticity of the material of the arm even if the cross-sectional shape of the arm is not modified.

What is claimed is:

1. A vibration wave motor comprising:
   a ring-shaped vibration member having an elastic metal member and electrostrictive elements fixed to said elastic metal member, in which elliptic vibrations are produced on a surface of said elastic metal member when an AC voltage for driving is applied to said electrostrictive elements; and
   a movable member frictionally contacted to said vibration member so as to be rotatably driven by said elliptic vibrations;
   wherein the improvement that a supported surface of said vibration member different from its surface frictionally contacted to said movable member is supported by a plurality of elastic supporting arms, the bases of said elastic supporting arms being fixed to a stator and wherein electrically conductive rubber pieces are affixed to those surfaces of said elastic supporting arms which contact said supported surface of said vibration member.

2. A vibration wave motor according to claim 1 further comprising a vibration preventing member arranged between said elastic supporting arms and said supported surface of said vibration member.

3. A vibration wave motor according to claim 1 wherein said elastic supporting arms are in the form of arms the cross-sectional shapes of which are partially modified.

4. A vibration wave motor according to claim 1 wherein said supporting arms also serve as means for producing a frictional force between said vibration member and said movable member.

* * * * *